(12) United States Patent
Oami

(10) Patent No.: US 12,183,083 B2
(45) Date of Patent: Dec. 31, 2024

(54) INFORMATION PROCESSING APPARATUS, INFORMATION PROCESSING METHOD, AND INFORMATION PROCESSING PROGRAM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/198,022

(22) Filed: May 16, 2023

(65) Prior Publication Data

US 2023/0290151 A1 Sep. 14, 2023

Related U.S. Application Data

(63) Continuation of application No. 16/285,333, filed on Feb. 26, 2019, now Pat. No. 11,816,897, which is a
(Continued)

(30) Foreign Application Priority Data

Sep. 28, 2012 (JP) .................... 2012-217592

(51) Int. Cl.
*G06F 16/00* (2019.01)
*G06F 16/732* (2019.01)
(Continued)

(52) U.S. Cl.
CPC .......... *G06V 20/52* (2022.01); *G06F 16/7335* (2019.01); *G06F 16/78* (2019.01); *H04N 5/91* (2013.01); *H04N 7/18* (2013.01)

(58) Field of Classification Search
CPC ..... G06V 20/52; G06F 16/7335; G06F 16/78; H04N 5/91; H04N 7/18
See application file for complete search history.

(56) References Cited

U.S. PATENT DOCUMENTS

| 6,757,008 B1 | 6/2004 | Smith | ................... H04N 5/225 |
| | | | 348/143 |
| 2002/0067258 A1 | 6/2002 | Lyons et al. | |
| | | (Continued) | |

FOREIGN PATENT DOCUMENTS

| JP | 2000030033 A | 1/2000 |
| JP | 2006166408 A | 6/2006 |
| | (Continued) | |

OTHER PUBLICATIONS

International Search Report for PCT Application No. PCT/JP2013/074191, mailed on Oct. 8, 2013.
(Continued)

*Primary Examiner* — Syed H Hasan

(57) ABSTRACT

To efficiency search for an object associated with a sensed event, an information processing apparatus includes a sensor that analyzes a captured video and senses whether a predetermined event has occurred, a determining unit that determines a type of an object to be used as query information based on a type of the event in response to sensing of the event occurrence, and a generator that detects the object of the determined type from the video and generates the query information based on the detected object.

15 Claims, 15 Drawing Sheets

Related U.S. Application Data continuation of application No. 14/430,416, filed as application No. PCT/JP2013/074191 on Sep. 9, 2013, now Pat. No. 10,248,868.

(51) Int. Cl.
*G06F 16/78* (2019.01)
*G06V 20/52* (2022.01)
*H04N 5/91* (2006.01)
*H04N 7/18* (2006.01)

(56) References Cited

U.S. PATENT DOCUMENTS

| | | | | |
|---|---|---|---|---|
| 2002/0198685 | A1 | 12/2002 | Mann | A63H 30/04 702/187 |
| 2003/0058111 | A1 | 3/2003 | Lee | G06K 9/00342 340/573.1 |
| 2003/0058341 | A1 | 3/2003 | Brodsky | G06K 9/00335 348/169 |
| 2004/0143602 | A1* | 7/2004 | Ruiz | G08B 13/122 348/E7.086 |
| 2004/0161133 | A1* | 8/2004 | Elazar | G08B 13/19615 382/115 |
| 2004/0218785 | A1 | 11/2004 | Kim | G08G 1/0175 382/105 |
| 2004/0240542 | A1* | 12/2004 | Yeredor | G08B 13/1968 348/169 |
| 2005/0046699 | A1 | 3/2005 | Oya | G08B 13/19691 348/207.1 |
| 2005/0073585 | A1* | 4/2005 | Ettinger | H04N 7/18 348/155 |
| 2005/0088407 | A1 | 4/2005 | Bell | H04N 21/25891 345/156 |
| 2005/0104727 | A1* | 5/2005 | Han | G08B 13/19652 340/541 |
| 2005/0216126 | A1 | 9/2005 | Koselka | B25J 5/007 700/259 |
| 2006/0093190 | A1 | 5/2006 | Cheng | G06K 9/6293 340/5.83 |
| 2006/0170769 | A1* | 8/2006 | Zhou | G06V 20/52 382/103 |
| 2007/0122000 | A1 | 5/2007 | Venetianer | G06V 20/52 382/103 |
| 2007/0291117 | A1 | 12/2007 | Velipasalar et al. | |
| 2007/0294207 | A1 | 12/2007 | Brown | G07G 1/0036 |
| 2008/0100704 | A1 | 5/2008 | Venetianer | G06F 16/7854 348/143 |
| 2008/0195257 | A1* | 8/2008 | Rauch | B61B 1/02 701/1 |
| 2008/0252722 | A1 | 10/2008 | Wang | G06K 9/00771 348/143 |
| 2009/0092283 | A1 | 4/2009 | Whillock | G06K 9/00771 382/103 |
| 2010/0026811 | A1 | 2/2010 | Palmer | G08B 13/196 348/159 |
| 2010/0036875 | A1* | 2/2010 | Miezianko | H04N 21/23418 707/E17.019 |
| 2010/0271478 | A1 | 10/2010 | Oya | H04N 5/76 348/143 |
| 2010/0278391 | A1 | 11/2010 | Hsu | A61B 5/7264 382/106 |
| 2011/0292232 | A1 | 12/2011 | Zhang | G06F 17/30247 348/222.1 |
| 2012/0020518 | A1 | 1/2012 | Taguchi | G06T 7/292 382/103 |
| 2012/0121229 | A1 | 5/2012 | Lee | H04N 7/18 386/224 |
| 2012/0201468 | A1 | 8/2012 | Oami | G06F 16/50 382/199 |
| 2013/0030875 | A1 | 1/2013 | Lee et al. | |
| 2013/0050483 | A1 | 2/2013 | Itoh | G06K 9/00771 348/143 |
| 2013/0050502 | A1 | 2/2013 | Saito | G06T 7/20 348/169 |
| 2013/0329958 | A1 | 12/2013 | Oami | G06T 7/20 382/103 |
| 2014/0071287 | A1 | 3/2014 | Tu | G06K 9/00751 348/150 |
| 2014/0132772 | A1* | 5/2014 | Billau | H04N 7/18 348/159 |
| 2018/0040241 | A1 | 2/2018 | Leblond | |

FOREIGN PATENT DOCUMENTS

| | | | |
|---|---|---|---|
| JP | 2006166409 A | 6/2006 | |
| JP | 2007134934 A | 5/2007 | |
| JP | 2008140093 A | 6/2008 | |
| JP | 2008294921 A | 12/2008 | |
| JP | 2009027393 A | 2/2009 | |
| JP | 2012099940 A | 5/2012 | |
| WO | WO-2011046128 A1 | 4/2011 | G06F 16/50 |

OTHER PUBLICATIONS

US Notice of Allowance for U.S. Appl. No. 16/285,314 mailed on Jan. 11, 2022.

Demirkus et al., Automated person categorization for video surveillance using soft biometrics. (Year: 2010).

Tu et al., Action Based Video Summarization for Convenience Stores. (Year: 2012).

US Ofice Action for U.S. Appl. No. 18/229,350, mailed on Apr. 25, 2024.

US Office Action for U.S. Appl. No. 18/229,412, mailed on Apr. 25, 2024.

US Office Action for U.S. Appl. No. 18/229,350, mailed on Oct. 18, 2024.

US Office Action for U.S. Appl. No. 18/229,412, mailed on Oct. 18, 2024.

* cited by examiner

| CAMERA ID | EVENT TYPE | OBJECT TYPE | TIME DIFFERENCE | TIME WIDTH | NUMBER OF IMAGES |
|---|---|---|---|---|---|
| XXXX | BLACK LIST | TOP/BOTTOM OF CLOTHING | 10 SEC AND 15 SEC BEFORE | 5 SEC | 2 |
| | PERSON WHO HAS FALLEN | FACE AND TOP/BOTTOM OF CLOTHING | 35 SEC AND 45 SEC BEFORE | 5 SEC | 2 |
| | ABANDONMENT | TOP/BOTTOM OF CLOTHING OF PERSON | 65 SEC, 75 SEC, AND 85 SEC BEFORE | 2 SEC | 3 |
| | CARRY AWAY | FACES AND TOPS/BOTTOMS OF CLOTHING OF VICTIM AND PERPETRATOR | 10 SEC BEFORE AND 2 SEC AFTER | 10 SEC | 2 |
| | INTRUSION SENSING | TOP/BOTTOM OF CLOTHING OF PERSON | 10 SEC BEFORE | 3 SEC | 1 |
| | HANGOUT SENSING | FACE AND TOP/BOTTOM OF CLOTHING OF PERSONS | 125 SEC BEFORE | 120 SEC | 5 |
| | DETOUR SENSING | FACE AND TOP/BOTTOM OF CLOTHING OF PERSONS | 65 SEC BEFORE | 60 SEC | 5 |
| | ... | ... | ... | ... | ... |

FIG. 7

INFORMATION PROCESSING APPARATUS, INFORMATION PROCESSING METHOD, AND INFORMATION PROCESSING PROGRAM

The present application is a Continuation application of Ser. No. 16/285,333 filed on Feb. 26, 2019, which is a Continuation application of Ser. No. 14/430,416 filed on Mar. 23, 2015, which issued as U.S. Pat. No. 10,248,868, which is a National Stage Entry of PCT/JP2013/074191 filed on Sep. 9, 2013, which claims priority from Japanese Patent Application JP2012-217592 filed on Sep. 28, 2012, the contents of all of which are incorporated herein by reference, in their entirety.

TECHNICAL FIELD

The present invention relates to a technique of searching for an object in a video.

BACKGROUND ART

In the above-described technical field, patent literature 1 discloses a technique of causing a guard to designate an image and a person region including a person supposed to be a criminal, tracking the designated person in image data before and after the acquisition time of the designated image, and calculating the features of the person from the obtained tracking result.

CITATION LIST

Patent Literature

Patent literature 1: Japanese Patent Laid-Open No. 2009-027393

SUMMARY OF THE INVENTION

Technical Problem

In the technique described in the literature, however, only when the guard has designated an image and issued an instruction, the person search is performed in other images. Hence, the search speed and accuracy largely change depending on the ability of the guard. Especially, since the guard does not always take optimum action depending on the event to be detected, the search accuracy for a necessary object may lower.

The present invention enables to provide a technique of solving the above-described problems.

Solution to Problem

One aspect of the present invention provides an information processing apparatus comprising:
  a sensor that analyzes a captured video and senses whether a predetermined event has occurred;
  a determining unit that determines a type of an object to be used as query information based on a type of the event in response to sensing of the event occurrence; and
  a generator that detects the object of the type determined by the determining unit from the video at a time other than the time of the event occurrence and generates the query information based on the object.

Another aspect of the present invention provides an information processing method comprising:
  analyzing a captured video and sensing whether a predetermined event has occurred;
  deciding a type of query information to be searched for in accordance with on a type of the event in response to sensing of the event occurrence; and
  generating the query information of the type determined in the deciding from the video at a time other than the time of the event occurrence.

Still other aspect of the present invention provides an information processing program for causing a computer to execute:
  analyzing a captured video and sensing whether a predetermined event has occurred;
  deciding a type of query information to be searched for in accordance with on a type of the event in response to sensing of the event occurrence; and
  generating the query information of the type determined in the deciding from the video at a time other than the time of the event occurrence.

Advantageous Effects of Invention

According to the present invention, it is possible to very efficiently search for an object associated with a sensed event.

BRIEF DESCRIPTION OF THE DRAWINGS

FIG. 7 is a view showing the arrangement of a table used by the search query generator according to the fourth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
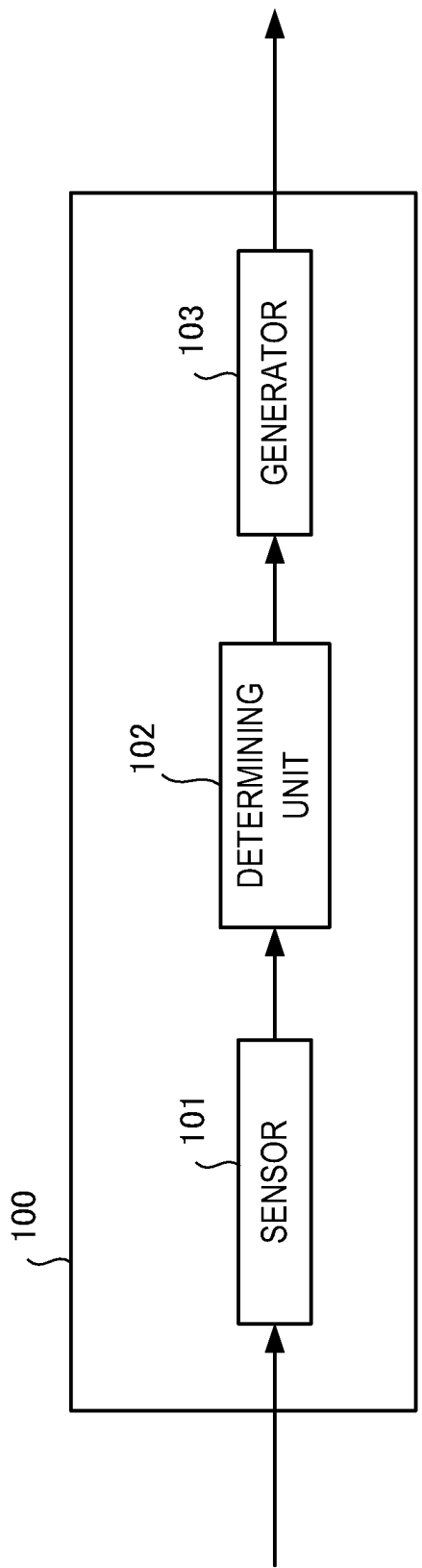
FIG. 1 is a block diagram showing the arrangement of an information processing apparatus according to the first embodiment of the present invention.

An information processing apparatus 100 according to the first embodiment of the present invention will be described with reference to FIG. 1. As shown in FIG. 1, the information processing apparatus 100 includes a sensor 101, a determining unit 102, and a generator 103. The sensor 101 analyzes a captured video and senses whether a predetermined event has occurred. In response to the event occurrence sensing by the sensor 101, the determining unit 102 determines, based on the event type, the type of an object to be used as query information. The generator 103 detects an object of the determined type from the video and generates query information based on the object.

When query information is generated by the above-described arrangement, and a search using the query information is performed, it is possible to very efficiently search for an object associated with the sensed event.

Second Embodiment

Figure 2:
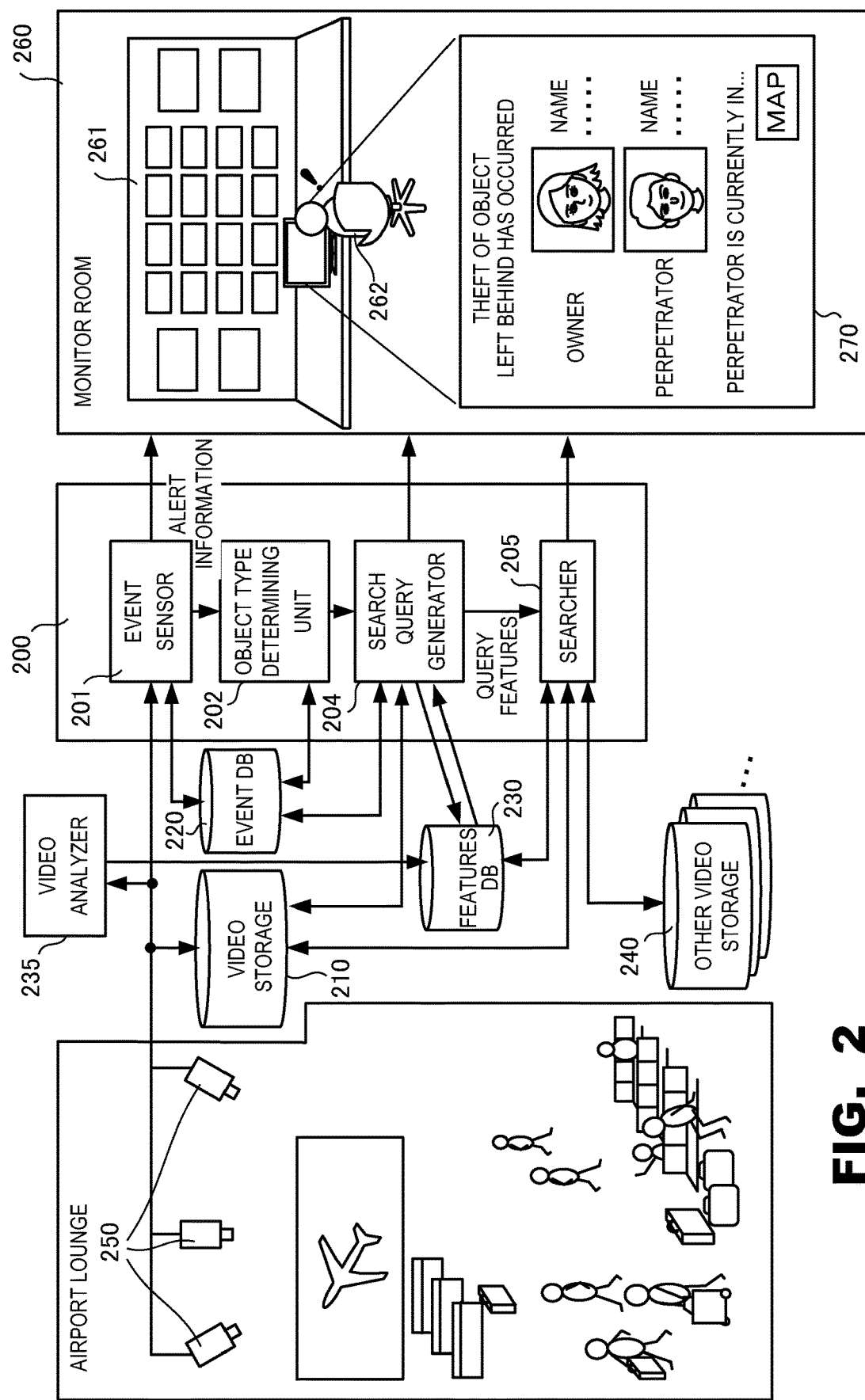
FIG. 2 is a block diagram showing the arrangement of an information processing apparatus according to the second embodiment of the present invention.

An information processing apparatus according to the second embodiment of the present invention will be described next with reference to FIG. 2. FIG. 2 is a block diagram for explaining the arrangement and use method of an information processing apparatus 200 according to this embodiment.

The information processing apparatus 200 automatically detects an event that occurs in an airport lounge by processing a video obtained by causing a surveillance camera 250 to capture people, benches, and the like in the airport lounge, and alerts a security guard or the like. The present invention is not limited to utilization in the airport lounge, as a matter of course, and is also usable in, for example, a casino, a shopping center, and the like.

The video captured by the surveillance camera 250 is stored in a video storage 210 and also sent to an event sensor 201. Alternatively, the video temporarily stored in the video storage 210 may be sent to the event sensor 201 a little later. The event sensor 201 analyzes the acquired video and confirms, by referring to an event database 220, whether an event as an alert target has not occurred. If an event as an alert target has occurred, alert information is generated and sent to an object type determining unit 202. The thus generated alert information is output to a search query generator 204. The alert information includes the time at which the alert is generated, the alert type, and information representing the position of the object as the alert target. The object position information can be expressed by coordinate values representing a position on the screen or coordinate values on a coordinate system projected onto a real space and calculated using camera parameters (for example, coordinate values on a coordinate system using a given point on the floor as a reference). Alternatively, the position information may be the position information of the circumscribed rectangle of the object or coordinate information representing a specific position such as the centroid of the object. In addition, various kinds of position information for specifying the position of the object are usable.

The alert targets include events that should attract attention of a guard, for example, appearance of a person included in a watch list (so-called black list), suspicious behavior, and an dangerous behavior. For example, an alert is generated upon detecting a person registered in the black list. The event sensor 201 can detect such a person by detecting a face from an input video, extracting features from the detected face, and collating the extracted features with those of the faces of persons registered in the black list in the event database 220.

The event sensor 201 also generates an alert upon sensing a specific behavior such as a fall or a crouch. More specifically, such a behavior can be detected by, for example, extracting a person from an input video, tracking the person through the frames, and sensing that the person's height has abruptly decreased, and the state has continued for a while. Alternatively, a discriminator may be constructed by learning person's states such as a crouch and a fall in advance. The parameters of the discriminator generated by the learning may be stored in the event database 220, and the states may be sensed using the discriminator.

The event sensor 201 also generates an alert when a person has entered a restricted area. This can be sensed by, for example, marking the floor area of the restricted area in an image and determining whether the feet of a detected/tracked person have entered the region. The event database 220 may store in advance which area becomes restricted at which timing, and which camera captures an object in what kind of manner.

The event sensor 201 also generates an alert upon sensing an abandoned object or theft of an object left behind. An abandoned object can be sensed by, for example, sensing placement of an object using background subtraction or the like, and detecting that the state has continued for a predetermined time or more.

The types of objects and their changes possible in a video and how to generate an alert in response to them are recorded in the event database 220 in advance.

The event database 220 also stores a table representing the correspondence concerning what kind of object should be found to generate a query in each event.

The object type determining unit 202 determines an object type serving as a search query for each of various kinds of events sensed in the above-described manner. For example, in the event of appearance of a person included in the black list, the clothing of the person is used as the search query. Hence, a full-length image capable of specifying the clothing (including take-alongs and a cap) is determined as the target object.

On the other hand, in the event of a person who has fallen, a face and clothing capable of specifying the person who has fallen are used as the search queries. Hence, a face image and a full-length image capable of specifying them are determined as objects.

In the event of finding of a person who has entered a restricted area, a face and clothing capable of specifying the person are used as the search queries. Hence, a face image and a full-length image capable of specifying them are determined as objects.

In the event of finding of an abandoned object or theft of an object left behind, a face and clothing capable of specifying the person who has abandoned the object or the person who owns the object left behind and stolen are used as the search queries. Hence, a face image and a full-length image capable of specifying them are determined as objects.

The search query generator 204 extracts the features of an object and generates query features that are features to be used as queries at the time of search. When selecting a query feature from features extracted in advance, the query feature is selected and acquired from features extracted from the camera video 250 by a video analyzer 235 and stored in a feature database 230. The generated query features are output to a searcher 205. The searcher 205 executes a search using the query features for videos stored in the video storage 210 or other video storages 240, and outputs a search result.

The searcher 205 searches the videos stored in the other video storages 240 for an object having features equal or similar to the query features. That is, the searcher 205 performs the search by collating the query features with the features of objects extracted from videos as search targets stored in the past and stored in the feature database 230. When the similarity between the features is sufficiently high because, for example, the similarity exceeds a predetermined threshold (or the similarity is sufficiently low because, for example, the distance between the features is equal to or smaller than a predetermined threshold), the search result includes the ID of the camera, time, and additional information altogether. Examples of the additional information are a thumbnail image, time information of the video necessary for a cue search, and a byte offset from the start of the file. A search result is generated by arranging the obtained results based on a predetermined criterion (for example, in descending order of similarity between features) and output.

The other video storages 240 store not only videos captured by the same camera as that for the video from which the query features are extracted but also videos captured by different cameras. The videos may include those up to the time immediately before the alert generation. In this case, object extraction and feature extraction are performed in real time for search target images, and the searcher 205 can immediately use the result.

This makes it possible to alert a guard 262 who is watching a monitor 261 in a monitor room 260 and also offer detailed information associated with the alert. When theft of an object left behind has occurred, the guard 262 is notified of the occurrence via a screen 270 of the display. It is possible to simultaneously offer the face images and full-length images of the owner and the perpetrator, their profiles if the profile information is available, and the current position of the perpetrator derived by causing the searcher 205 to search other videos, and the like. An image of the person in question may be displayed on the hand-held terminal of the guard and used for pursuit.

It is possible to present the guard 262 the past location of an object by searching for the same object in videos captured by other cameras up to the time immediately before the alert generation time. If the video can be reproduced from the search time by a cue search, the video scene that has undergone the search is reproduced by the cue search so that the guard 262 can confirm the state and behavior of the object.

Note that the information processing apparatus 200 shown in FIG. 2 includes a CPU (Central Processing Unit), a storage, a RAM (Random Access Memory), and a communication controller (none are shown) as hardware components. The storage stores program modules corresponding to the event sensor 201, the object type determining unit 202, the search query generator 204, and the searcher 205. The CPU executes the program modules to implement their functions. Data generated by a program module, for example, alert information, object type, a query feature, or the like is temporarily stored in the RAM and then used by another program module or stored in various kinds of databases.

Figure 3:
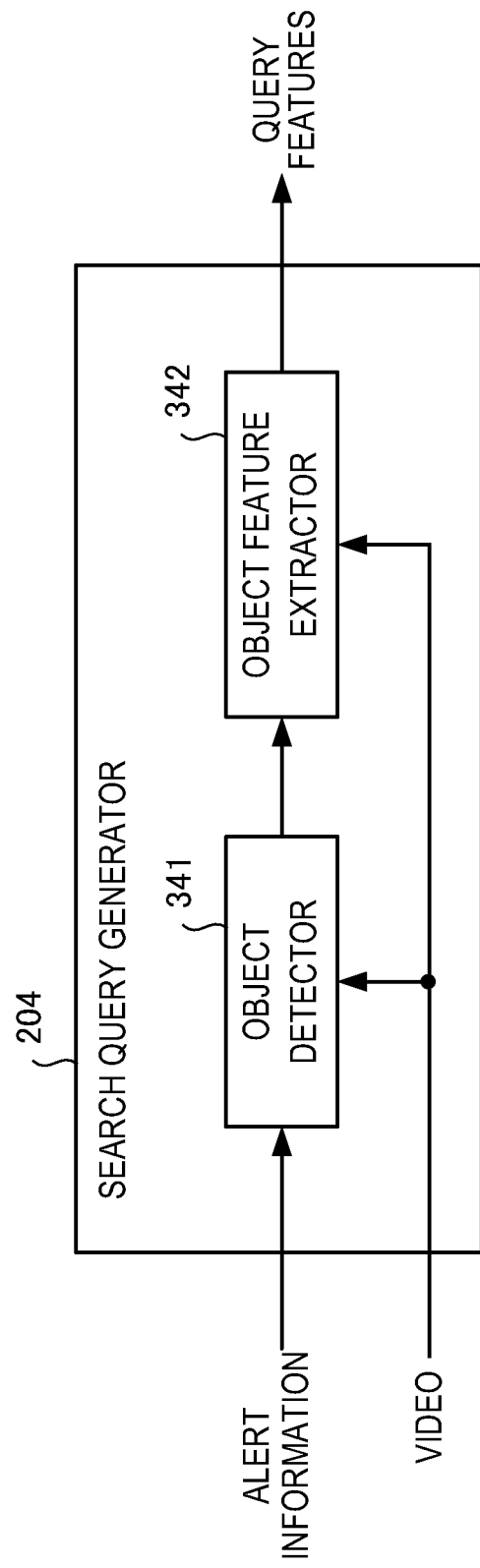
FIG. 3 is a block diagram showing the arrangement of a search query generator according to the second embodiment of the present invention.

FIG. 3 is a block diagram showing the internal arrangement of the search query generator 204 according to this embodiment. The search query generator 204 includes an object detector 341 and an object feature extractor 342. The object detector 341 detects an object from alert information and a video and outputs object information to the object feature extractor 342. The object feature extractor 342 extracts object features from the object information and the video and outputs them as query features.

The operation in FIG. 3 will be described next.

(When Performing Object Detection for First Time by Alert Information)

Alert information and a video are input to the object detector 341. Based on the position information and time information of an object included in the alert information, the object detector 341 detects the object located at a corresponding position in a corresponding frame of the video and outputs an object region information. For example, when the object is a person, and the alert is a black list collation alert, the alert information includes the object information of a face. The object detector 341 extracts the region of the whole person from the video, and generates the information of the region of the whole person as the object region information, including the position information of the face. In, for example, a behavior alert, the region where a feature of the object should be extracted (for example, if the feature to be extracted is a clothing feature, the clothing region of the person) is obtained and generated as the object region information while increasing the accuracy of the position information of the object included in the alert information. If the position information of the object included in the alert information can directly be used as the object region information, the processing may be skipped without performing any processing in the object detector 341. The generated object region information is output to the object feature extractor 342 as object information.

The object feature extractor 342 extracts the features of the object from the video based on the object information. For example, when the object is a person, a face feature and a clothing feature are extracted. If the video is not suitable for face feature extraction because, for example, the face size is too small, or the person is not facing the front, only the clothing feature may be extracted. When extracting the clothing feature, the clothing may be divided into several parts, and a feature may be extracted in each part. For example, the features may be extracted by dividing the clothing into the clothing of the upper half of the body and that of the lower half of the body. Alternatively, the features may be extracted by separating belongings other than the clothing or take-alongs such as a cap and glasses. When the object is a car, license plate information and the features of the car body are extracted. If the license plate cannot be recognized because it is invisible or too small, only the features (color, shape, and model) of the car body may be extracted. The thus extracted features are output as query features.

(When Performing Object Detection/Feature Extraction in Advance and Selecting Features from Them)

A case in which the search query generator 204 extracts the features of an object after alert generation has been described above. If object feature extraction has already been performed in real time, the object features need not be extracted again. In this case, a feature to be used as a query feature is simply selected from the already extracted object features. More specifically, the object detector 341 limits video frames based on the time information designated by the alert information, selects an object having close object position information in the frames, and outputs its region information as object information. The object feature extractor 342 selects the features of the object designated by the object information from the already extracted object features, and outputs the selected features as query features.

Figure 4:
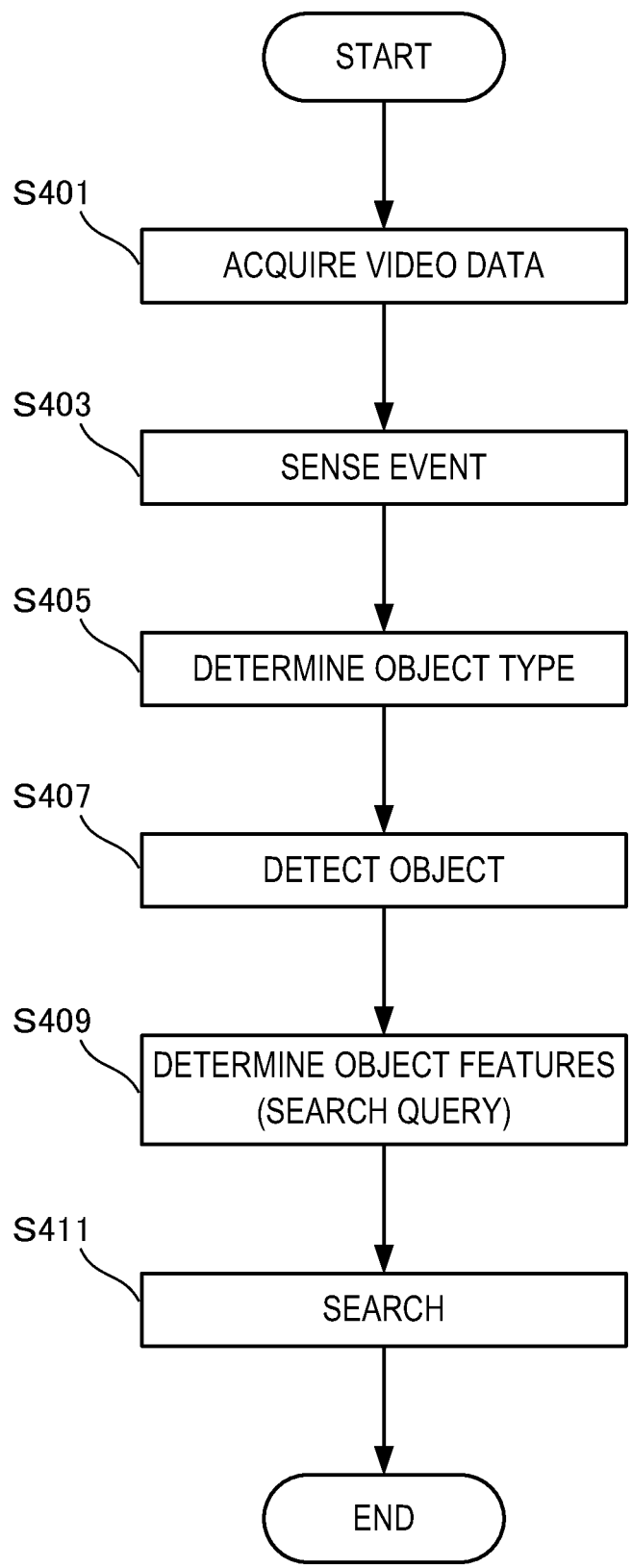
FIG. 4 is a flowchart showing the procedure of processing of the information processing apparatus according to the second embodiment of the present invention.

The procedure of processing according to this embodiment will be described with reference to the flowchart shown in FIG. 4. First, in step S401, the video storage 210 or the event sensor 201 acquires a video from the surveillance camera 250.

In step S403, the event sensor 201 senses that a predetermined event (alert target) has occurred in the video.

In step S405, based on the sensed event, the object type determining unit 202 determines the type of an object to be further searched for. When the object type is determined, the process advances to step S407, and the search query generator 204 extracts the object of the type from videos before and after the event occurrence. In step S409, the features of the detected object are obtained, and search queries are determined based on the features. In step S411, the searcher 205 searches the stored videos for the search queries.

With the above-described arrangement and operation, according to this embodiment, it is possible to immediately execute a search in response to alert issuance and track the target person or object.

Third Embodiment

Figure 5:
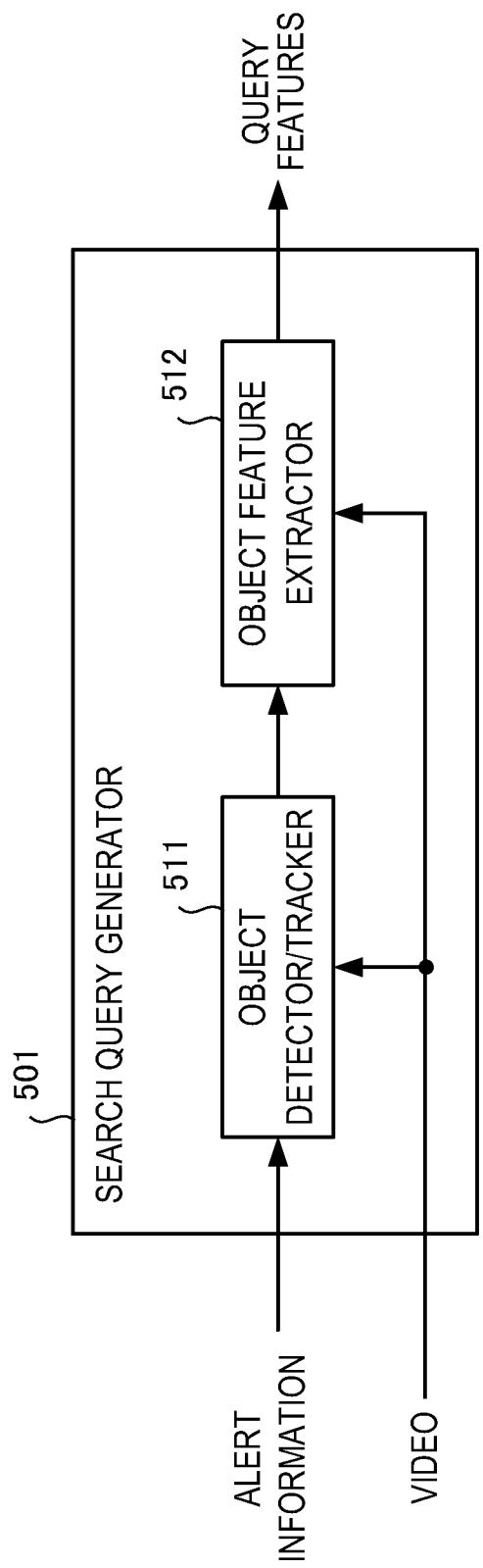
FIG. 5 is a block diagram showing the arrangement of a search query generator according to the third embodiment of the present invention.

An information processing apparatus according to the third embodiment of the present invention will be described next with reference to FIG. 5. FIG. 5 is a block diagram for explaining the arrangement and use method of a search query generator according to this embodiment. This embodiment is different from the above-described second embodiment in that a search query generator 501 includes an object detector/tracker 511 and an object feature extractor 512. The rest of the arrangement and operation is the same as in the second embodiment. The same arrangement and operation are denoted by the same reference numerals, and a detailed description thereof will be omitted.

The object detector/tracker 511 extracts an object from alert information and a video, tracks the object through frames, and outputs object information to the object feature extractor 512. The object feature extractor 512 extracts object features from the object information and the video and outputs them as query features.

(When Performing Object Detection for First Time by Alert Information)

When the object detector/tracker 511 tracks an object through frames, the tracking continues from before alert generation. The alert information and the video are input to the object detector/tracker 511. The object detector/tracker 511 performs object detection and detection processing in the input video, compares the result with object position information included in the alert information based on time information, and determines the target object. Next, the tracking result of the object is checked, and a result suitable for feature extraction is selected from the object detection results included in the tracking result. How large the object will be detected at each position of images can be calculated in advance using the calibration information of the camera (camera parameter information). Hence, a result whose detected size is close to the assumed value and which has a posture and state suitable for feature extraction is selected. In case of, for example, a person, a person who is standing erect in posture and whose foot or upper half of the body is not cut is selected. This can be determined based on, for example, information such as the aspect ratio of the circumscribed rectangular shape of the detected object or the position on the screen. Alternatively, when the shape information of the object can simultaneously be acquired (for example, when the silhouette can be obtained by background subtraction), the appropriateness of the posture and state may be determined from the shape information. Note that a plurality of object detection results (that is, detection results at a plurality of different times) may be selected. The time and object region information of the selected object are output to the object feature extractor 512 as object information.

The object feature extractor 512 extracts object features from the video based on the object information, like the object feature extractor 342 shown in FIG. 3. In this case, however, the object information may include a previous time as the time of feature extraction. In this case, the object features are extracted from the video frame of the corresponding time. In addition, there may exist a plurality of feature extraction times included in the object information. In this case, object features are extracted from the respective frames of the designated times, and the set of the extracted features is output as a query feature.

Note that if object detection/tracking processing is performed at the same time as the alert generation, the object detector/tracker 511 may use object detection/tracking information obtained there. When the features have already been extracted at the time of object detection/tracking, the object feature extractor 512 may select the feature at the designated time from the already extracted features and generate the query feature.

As described above, according to this embodiment, an object is detected and tracked. This makes it possible to more properly generate a search query and improve the search accuracy.

Fourth Embodiment

Figure 6:
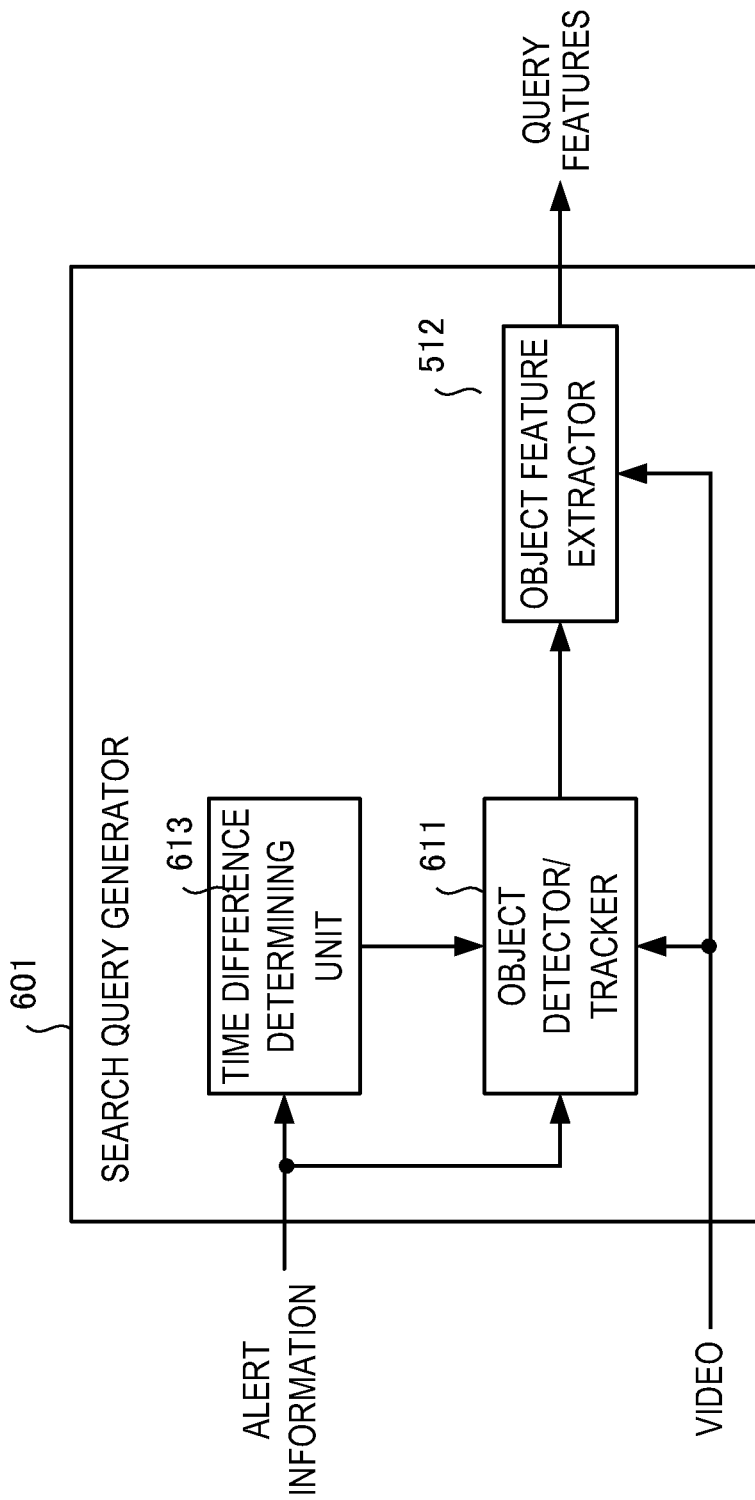
FIG. 6 is a block diagram showing the arrangement of a search query generator according to the fourth embodiment of the present invention.

An information processing apparatus according to the fourth embodiment of the present invention will be described with reference to FIG. 6. FIG. 6 is a block diagram for explaining the arrangement and use method of a search query generator according to this embodiment. This embodiment is different from the above-described third embodiment in that a search query generator 501 includes a time difference determining unit 613 and an object detector/tracker 611. The rest of the arrangement and operation is the same as in the second embodiment. The same arrangement and operation are denoted by the same reference numerals, and a detailed description thereof will be omitted.

The time difference determining unit 613 determines feature extraction time information serving as the reference of query feature extraction from alert information and outputs it to the object detector/tracker 611. The object detector/tracker 611 obtains object information from the alert information, a video, and the feature extraction time information and outputs it to an object feature extractor 512. The object feature extractor 512 extracts object features from the object information and the video and outputs them as query features.

The alert information is input to the time difference determining unit 613. Based on event type information included in the alert information, the time difference determining unit 613 determines time difference information that designates how long the time goes back from the alert generation time to use video data as a query. This time difference changes depending on the event type and is therefore determined based on an event table 700 set as shown in FIG. 7. The event table 700 holds time difference information for each event type, and the time difference information is selected in accordance with input alert information.

The thus determined time difference information is output to the object detector/tracker 611. In addition to the time difference information, the alert information and the video are also input to the object detector/tracker 611. The object detector/tracker 611 determines the target object, like the object detector/tracker 511 shown in FIG. 5. The time (query generation reference time) that goes back from the alert generation time by the time designated by the time difference information is obtained. An object detection result at that time is obtained from the tracking result of the object. The time and the object detection result are generated as object information and output. Alternatively, an object detection result suitable for feature extraction may be selected from the tracking results before and after the query generation reference time, generated as object information, and output, like the object detector/tracker 511 shown in FIG. 5. The generated object information is output to the object feature extractor 512.

The object feature extractor 512 generates and outputs object features, as described with reference to FIG. 5.

Note that if object detection/tracking processing is performed at the same time as the alert generation, the object detector/tracker 611 may use object detection/tracking information obtained there. When the features have already been extracted at the time of object detection/tracking, the object feature extractor 512 may select the feature at the designated time from the already extracted features and generate the query feature.

In this embodiment, when an alert is generated, an image suitable for a search is selected based on tracking information at that time and alert type information, and the search is automatically executed. It is therefore possible to implement a quick search in real time when an alert is generated. As a possible use, for example, when a suspicious person alert is generated, the video of a camera located near the camera that has issued the alert is searched to track the person.

The search is performed using the features obtained in the above-described way as the query features. If the similarity between the features extracted within the tracked range is low, the search may be performed after presenting the features to the guard and causing him/her to determine whether they indicate the same person. When a person is tracked before and after the video designated by the guard, and the search is performed by designating features supposed to be most reliable in the video, the search accuracy is expected to be higher than when performing the search using only images designated by the guard.

FIG. 7 is a view showing the event table 700 used to set an object type, a predetermined time difference, a predetermined time width, and the number of object search images in accordance with an event type. This will be explained below in detail for each event type.

(1) Black List Collation

Objects to be Searched for and Queries to be Generated

A face and clothing are searched for as objects. A clothing feature is extracted in addition to a face feature. For this reason, the features are extracted at a person position suitable for clothing feature extraction (including the upper and lower halves of the body).

Time Difference

Figure 8:
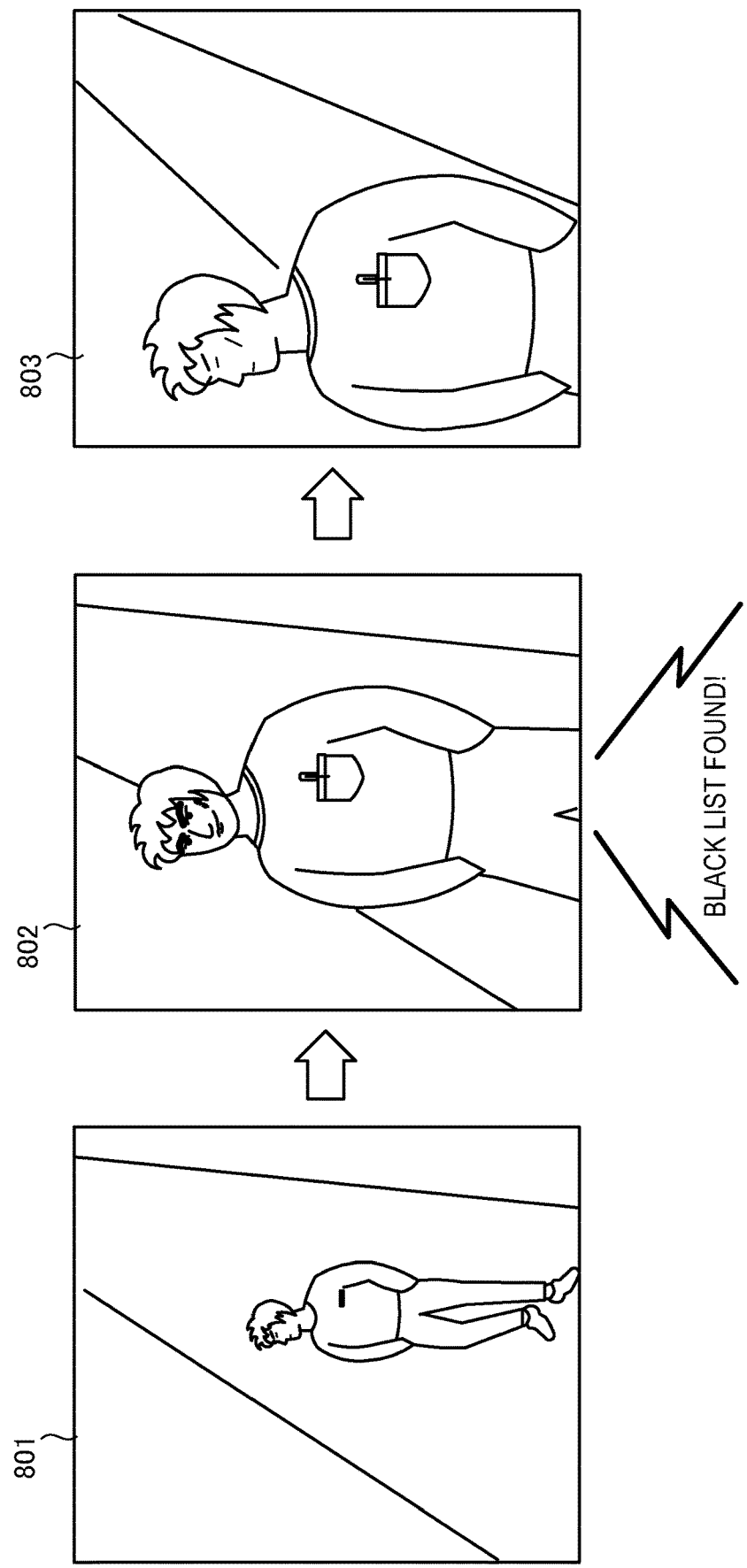
FIG. 8 is a view for explaining the operation of the search query generator according to the fourth embodiment of the present invention.

The clothing features cannot sufficiently be extracted from an image including a face in a large size. It is therefore necessary to extract the features from images different from the image at the time of alert. The person position suitable for extraction is determined by the camera arrangement (viewing angle). Basically, the image preferably includes the person from head to foot in a size as large as possible. In a camera arrangement for capturing a person approaching from far away, as shown in FIG. 8, the moving time elapsed from an image 801 including a foot reaching the lower edge of the screen to an image 802 in which face collation is actually possible is designated as the time difference for query generation. That is, the average moving time (or a representative value such as the median or mode of the moving time) from the image 801 that includes the person in full length and facilitates extraction of clothing features to the image 802 in which the person is located at a position where the face is captured so large that the black list collation is possible is obtained in advance. A value almost equal to or larger than the moving time is determined as the time difference information. As for the clothing pattern features, more detailed information can be obtained by locating the person as close as possible. For this reason, in an image 803 including the person at a shorter distance, the features of the upper portion of the clothing may be extracted in more detail to create the search queries.

Number of Images to be Used for Query Generation (Number of Time Differences)

Basically, one image in which the person is located in full length before alert generation suffices, as described above. However, a plurality of images may be acquired near the position, and a plurality of reliable features among them may be used. The reliability of clothing feature extraction can be determined based on the aspect ratio of the circumscribed rectangle of the person or the degree of person likelihood of the person silhouette shape. The degree of person likelihood can be calculated using a discriminator that has learned person silhouettes. As for a color feature, the reliability can be evaluated by analyzing the magnitude of saturation and that of brightness of a color (if the saturation or brightness is low, the influence of shadow or the like is supposedly present) and the presence/absence of a portion where the pixel values are saturated.

(2) Fall Sensing

Objects to be Searched for and Queries to be Generated

A face and clothing are searched for as objects. It is difficult to accurately separate and extract the information of clothing of the upper and lower halves of the body in a fall state. For this reason, the features are extracted from an image of a person standing erect. To specify a person or his/her history from the clothing information of the person who has fallen down, an image of a normal erect posture is necessary for extracting appropriate features. In particular, to do a search with a distinction between the clothing of the upper half of the body and that of the lower half, the features need to be extracted while separating the upper half and lower half of the body. Hence, an image of an erect posture is important in this case as well.

To more properly obtain features suitable for a search using a tracking result, the tracking time needs to be prolonged so that a video with the person before the fall is included. In this case, since tracking processing is time-consuming, no quick search can be performed. Hence, the efficiency can be raised by searching for not the tracking result but an image within a designated range.

Time Difference

Fall sensing is basically set to issue an alert after the elapse of a predetermined time from a fall. For this reason, a time slightly longer than a set determination time is set as the time difference (for example, if the alert is set to be issued when a person has fallen down and remained immovable for 30 sec, the time difference is set to, for example, 35 sec).

Number of Images to be Used for Query Generation (Number of Time Differences)

Figure 9:
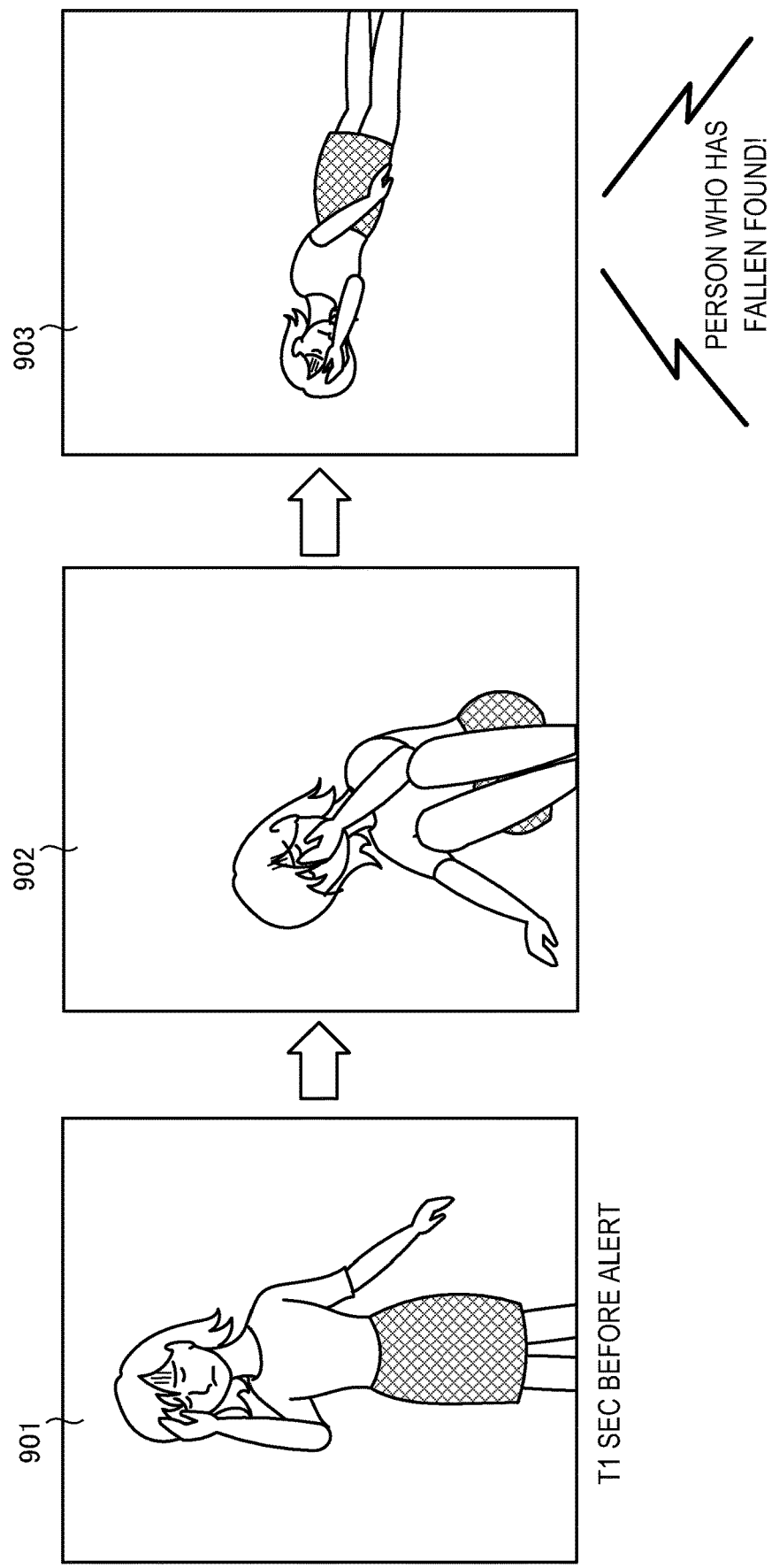
FIG. 9 is a view for explaining the operation of the search query generator according to the fourth embodiment of the present invention.

As shown in FIG. 9, when a fall is sensed from an image 903, basically, using one full-length image 901 going back sufficiently long suffices to extract an object. However, a long time may elapse before the fall in a state in which the person crouches down a little while facing downward, like an image 902. In this situation, the clothing features may badly be extracted. Hence, to select features a little before, a plurality of images at longer time differences may be used (for example, in the above-described example, two images 45 sec and 55 sec before are used together). Queries may be generated using all of the plurality of selected images.

Alternatively, the reliabilities may be calculated, and only images of high reliabilities (for example, reliabilities higher than a predetermined threshold) may be used, as in black list collation.

(3) Abandonment/Carry Away

Objects to be Searched for and Queries to be Generated

Although an alert itself is issued upon sensing abandoned luggage (or a region that has newly appeared after luggage has been carried away), the features of the person who has abandoned/carried away the object are extracted. In this case as well, clothing features are extracted because face features are often difficult to extract.

Time Difference

Figure 10:
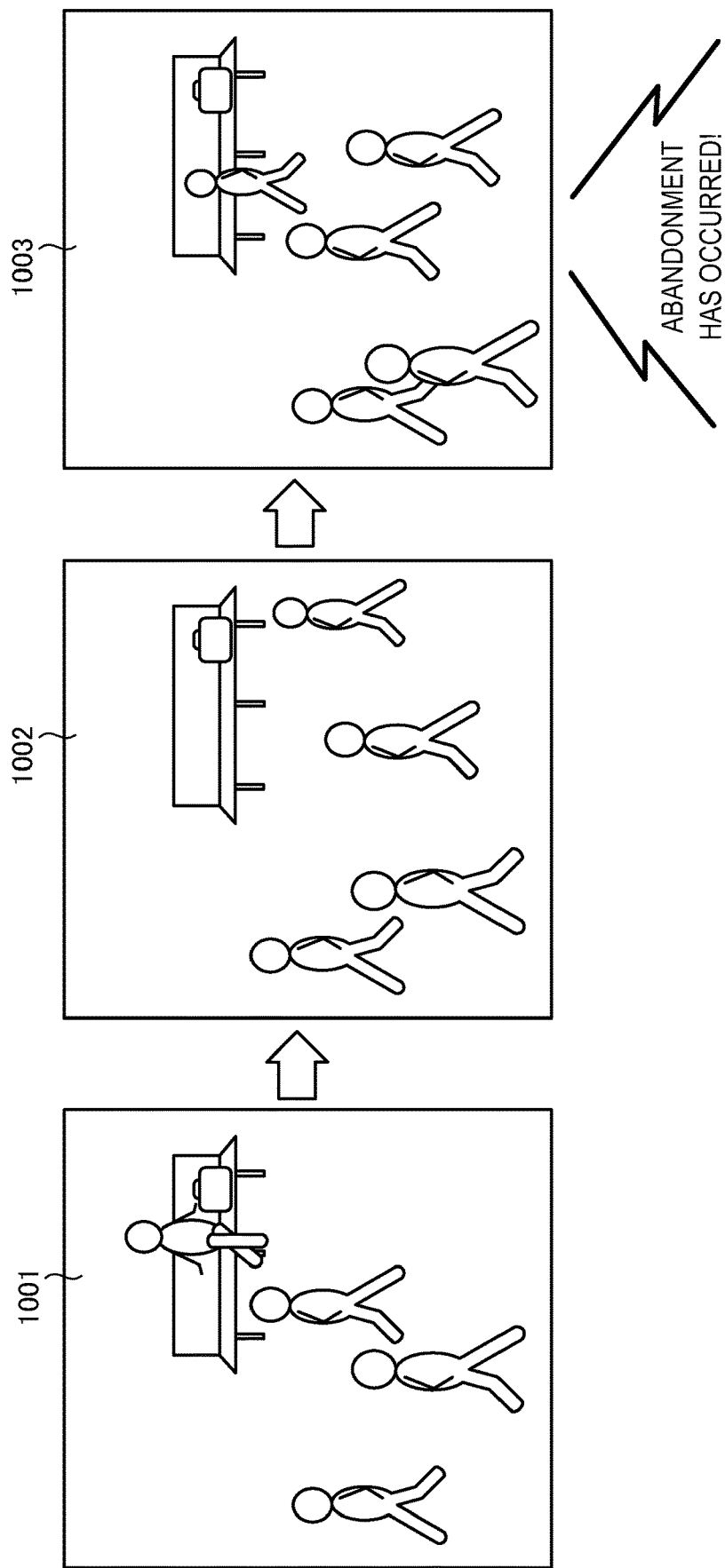
FIG. 10 is a view for explaining the operation of the search query generator according to the fourth embodiment of the present invention.

Abandonment is basically sensed when the rest time of an object has exceeded a predetermined threshold, as in images 1002 and 1003 shown in FIG. 10. For this reason, a time slightly longer than the determination time is set as the time difference. That is, to issue an alert upon sensing abandonment, a value equal to or more than the time until an abandoned object is determined is determined as time difference information, and a person near the object as in an image 1001 is searched for. Note that in this case, not the features of the object but those of the person who has abandoned the object are extracted.

Figure 11:
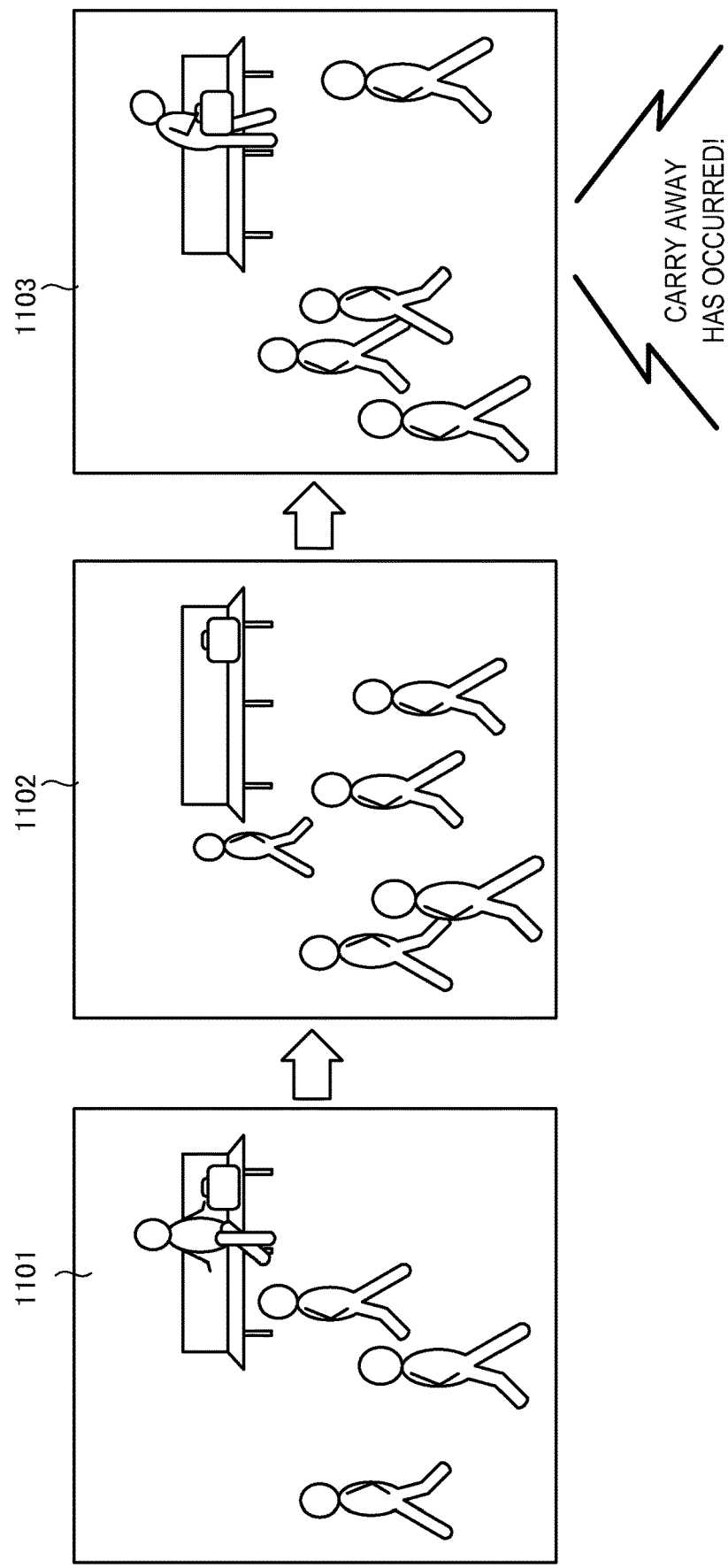
FIG. 11 is a view for explaining the operation of the search query generator according to the fourth embodiment of the present invention.

Carry away is sensed upon finding a person who has carried away an object that has remained immovable for a predetermined time, as in images 1102 and 1103 shown in FIG. 11. For the person who has carried away the object, object extraction is performed without a time difference, and the features of the face and clothing of the person are generated. On the other hand, for the person from whom the object has been carried away, a value equal to or more than the carry away determination time is determined as time difference information, and a person who existed first near the object as in an image 1101 is searched for. The features of the face and clothing of the person are extracted. The reliability of carry away determination may be raised by collating the person in the image 1101 with the person in the image 1103.

Number of Images to be Used for Query Generation (Number of Time Differences)

An action to place an object on the floor is expected to take a predetermined time. During the placing action, the person may be in a posture unsuitable for clothing feature extraction because he/she crouches or bends. The person may abandon an object by, for example, dropping it without largely changing the posture. Hence, a plurality of times slightly longer than the set determination time are set as the time differences (for example, if the alert is set to be issued when an object has remained immovable for 60 sec, three time differences are set to, for example, 65 sec, 75 sec, and 85 sec).

(4) Intrusion Sensing

Objects to be Searched for and Queries to be Generated

Basically, in a situation where intrusion sensing is performed, the face is not always visible and is unsuitable for feature extraction. Hence, clothing features are extracted.

Time Difference

Figure 12:
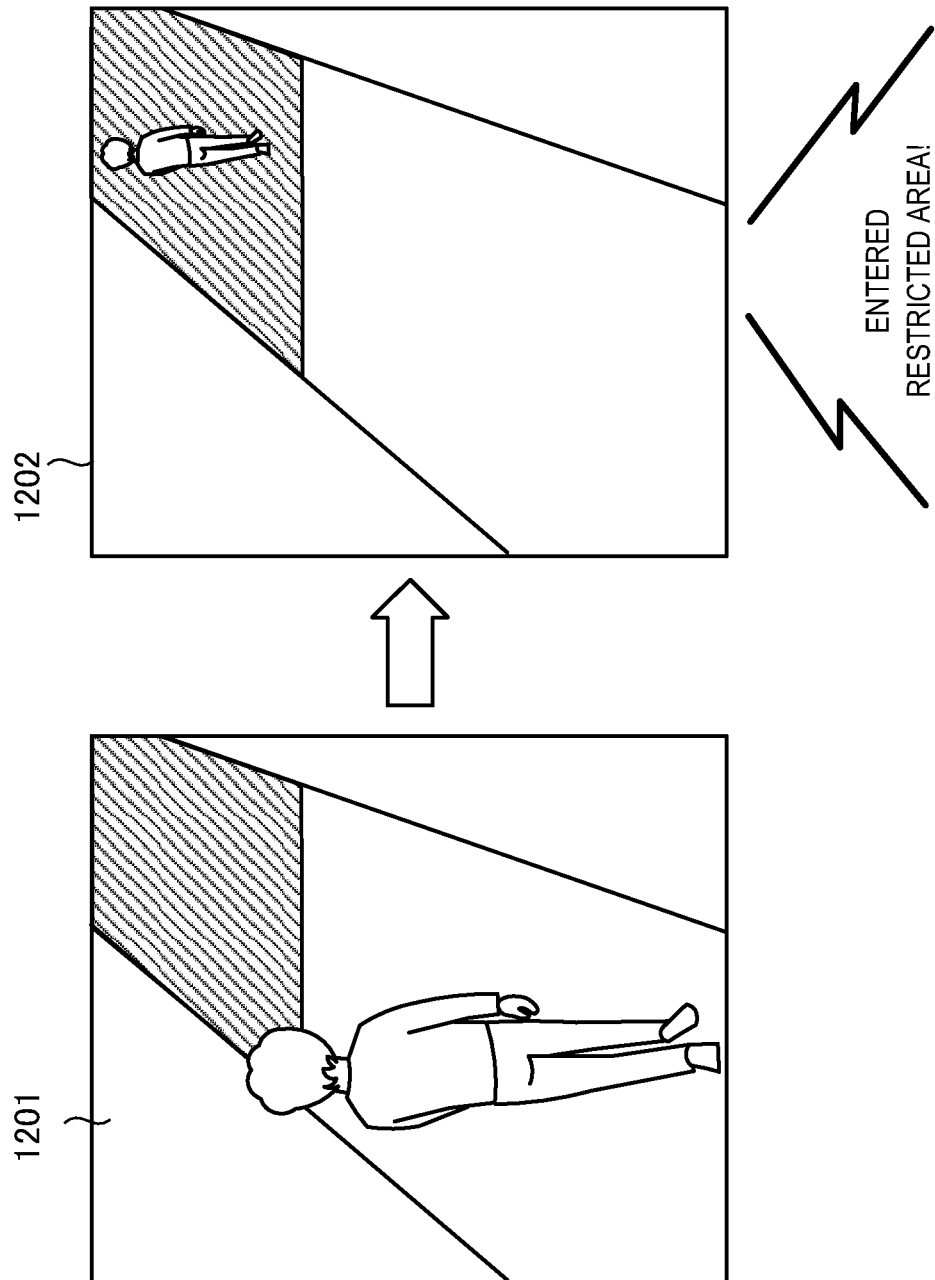
FIG. 12 is a view for explaining the operation of the search query generator according to the fourth embodiment of the present invention.

As shown in FIG. 12, the clothing features in an image 1202 at the time of alert generation may be obtained. However, the person's position suitable for the clothing features is determined by the viewing angle of the camera, as in black list collation. Assume that the restricted area is set on the far side of the camera, as shown in FIG. 12. In this case, before entering the restricted area, the person is located close to the camera, and more detailed clothing features can be extracted. Hence, a timing like an image 1201 including the person in full length as large as possible is determined, and the time until movement to the restricted area is set as the time difference. Reversely, assume that the restricted area is located on the near side of the camera, and intrusion is sensed when a person has moved closer from far away. In this case, the time difference is set such that the clothing features are extracted when the person has moved a little longer from the timing immediately after entering the restricted area.

Number of Images to be Used for Query Generation (Number of Time Differences)

Basically, one image suffices, as in black list collation.

(5) Hangout/Detour Behavior Sensing

Objects to be Searched for and Queries to be Generated

Although an alert itself is generated upon sensing occurrence of hangout or occurrence of a detour behavior, the extraction targets are the features of the person who is the cause of the hangout or detour behavior. In this case as well, clothing features are extracted because face features are often difficult to extract.

"Hangout" indicates a long-time stop of a plurality of persons. "Detour behavior" indicates people's behavior of avoiding a spilled liquid, suspicious substance, soil, or the like on the floor, or a suspicious (dangerous) person.

The search target is, for example, a person (for example, street performer) who has caused the hangout or a suspicious (dangerous) person who has caused the detour behavior.
Time Difference Basically, a time slightly longer than the determination time necessary to sense the hangout or detour behavior is set as the time difference (for example, if the alert is set to be issued when a plurality of persons have stopped for 30, 60, or 120 sec etc., the time difference is set to, for example, 35, 65, or 125 sec).
Number of Images to be Used for Query Generation (Number of Time Differences)

Basically, one image before alert generation suffices, as described above. However, a plurality of images may be acquired in the vicinity, and a plurality of reliable features in the images may be used. As described above, the reliability of clothing feature extraction can be determined based on the aspect ratio of the circumscribed rectangle of a person or the degree of person likelihood of a person silhouette shape.

As described above, a search can be performed very accurately because object detection and search query generation are performed at a time difference corresponding to the event that has occurred.

Fifth Embodiment

Figure 13:
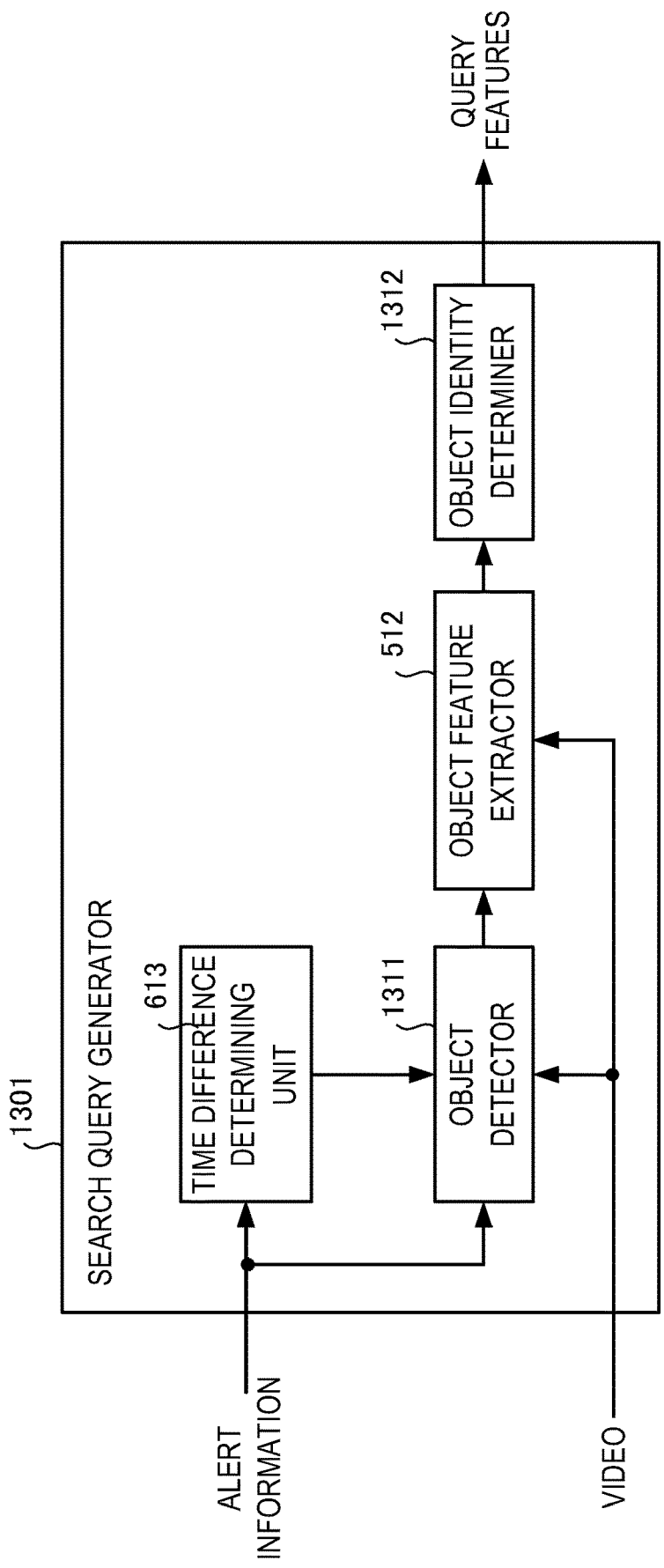
FIG. 13 is a block diagram showing the arrangement of a search query generator according to the fifth embodiment of the present invention.

An information processing apparatus according to the fifth embodiment of the present invention will be described with reference to FIG. 13. FIG. 13 is a block diagram for explaining the arrangement and use method of a search query generator 1301 according to this embodiment. This embodiment is different from the above-described fourth embodiment in that the search query generator 1301 includes an object identity determiner 1312, and includes an object detector 1311 in place of the object detector/tracker 611. The rest of the arrangement and operation is the same as in the second embodiment. The same arrangement and operation are denoted by the same reference numerals, and a detailed description thereof will be omitted.

When the object detector 1311 does not perform tracking, the object identity determiner 1312 determines, after object feature generation, whether an object is identical to that at the time of alert generation. In this case, the object detector 1311 outputs two object detection results: the object detection result at the time of alert generation and that at the time given the time difference given by a time difference determining unit 613. An object feature extractor 512 extracts object features for each result and outputs them to the object identity determiner 1312. The object identity determiner 1312 determines the similarity between the features. Upon determining that the objects are identical, the features given the time difference are output as query features. On the other hand, upon determining that the objects are not identical, the features at the time of alert generation are output as query features.

Note that alert information may also be input to the object identity determiner 1312, and the identity determination criterion may be changed in accordance with the alert type. For example, in fall sensing, since the similarity between the features lowers depending on the difference in the posture, the similarity determination criterion may be lenient. Alternatively, by attaching importance to the object position information, if the object positions are almost the same, the features may be output, regarding the objects as identical even if the similarity is low. In abandonment sensing as well, the determination may be performed in consideration of the position information.

Sixth Embodiment

Figure 14:
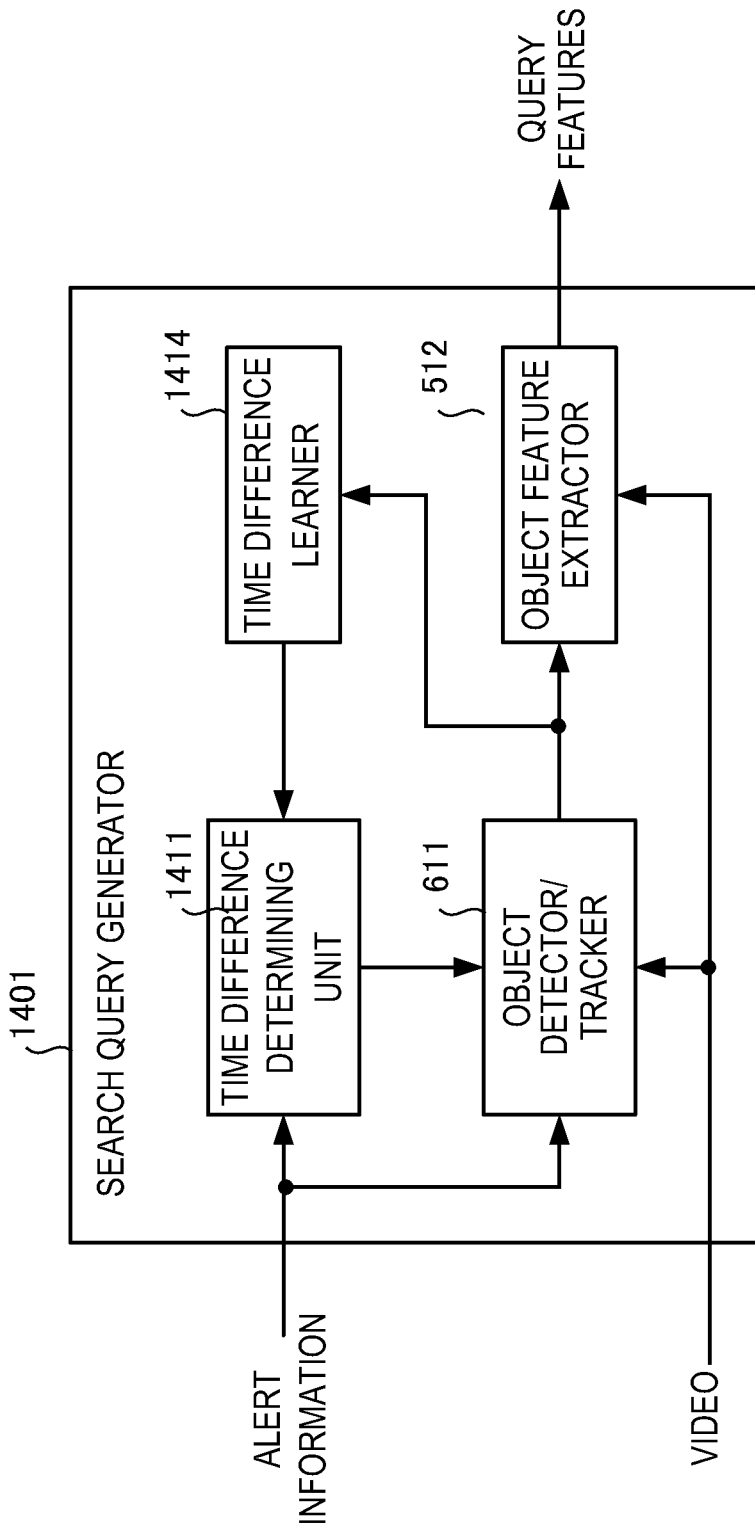
FIG. 14 is a block diagram showing the arrangement of a search query generator according to the sixth embodiment of the present invention.

An information processing apparatus according to the sixth embodiment of the present invention will be described with reference to FIG. 14. FIG. 14 is a block diagram for explaining the arrangement and use method of a search query generator 1401 according to this embodiment. This embodiment is different from the above-described fourth embodiment in that the search query generator 1401 includes a time difference learner 1414. The rest of the arrangement and operation is the same as in the fourth embodiment. The same arrangement and operation are denoted by the same reference numerals, and a detailed description thereof will be omitted.

When the time difference is determined depending on the camera arrangement, the search query generator 1401 shown in FIG. 14 learns the time difference from an object detection/tracking result. Based on event type information included in alert information, a time difference determining unit 1411 determines time difference information that designates how long the time goes back from the alert generation time to use video data as a query, like the time difference determining unit 613.

This time difference is determined based on an event table 700 set as shown in FIG. 7. The time difference information in the event table 700 here can be updated in accordance with an instruction from the time difference learner 1414. The time difference learner 1414 measures, from the object detection/tracking result, a time needed for a person to move from the position at the time of alert generation to the position where clothing features are easily extracted, and calculates the representative value of the time difference by statistically processing the measurement result. The time difference learner 1414 updates the time difference stored in the time difference determining unit 1411 by the representative value. As the method of calculating the representative value of the time difference, not only the average but also the median or mode, or an average calculated while excluding, as outliers, portions of a predetermined percentage or more on both sides of the distribution is usable.

The time difference may be calculated by inputting, to the time difference learner 1414, not only the simple object size but also information representing whether the illumination condition or background is suitable for feature extraction. For example, if there is a place that is slightly small in size but is capable of stably extracting features under the illumination, the time of movement from the position to the position at the time of alert generation may be calculated. If a plurality of such places exist, the time difference may be obtained for each place, and the time difference representative value may be calculated for each place. Alternatively, if there is a place where the background has a color different from the color of clothing, and the features can easily be extracted (for example, a place with a dark background color is preferable for a person dressed in white), that place may be used. However, the easily extractable background color changes depending on the color of clothing. Hence, a plurality of positions may be obtained, and the representative value of the time difference may be obtained for each position. In this case, a suitable time difference is selected in accordance with the color actually extracted by an object feature extractor 512 at the time of query feature generation.

As described above, according to this embodiment, since object detection is performed while learning the time differences, the object extraction image selection accuracy is improved along with the use. As a result, the accuracy of query features is improved.

Seventh Embodiment

Figure 15:
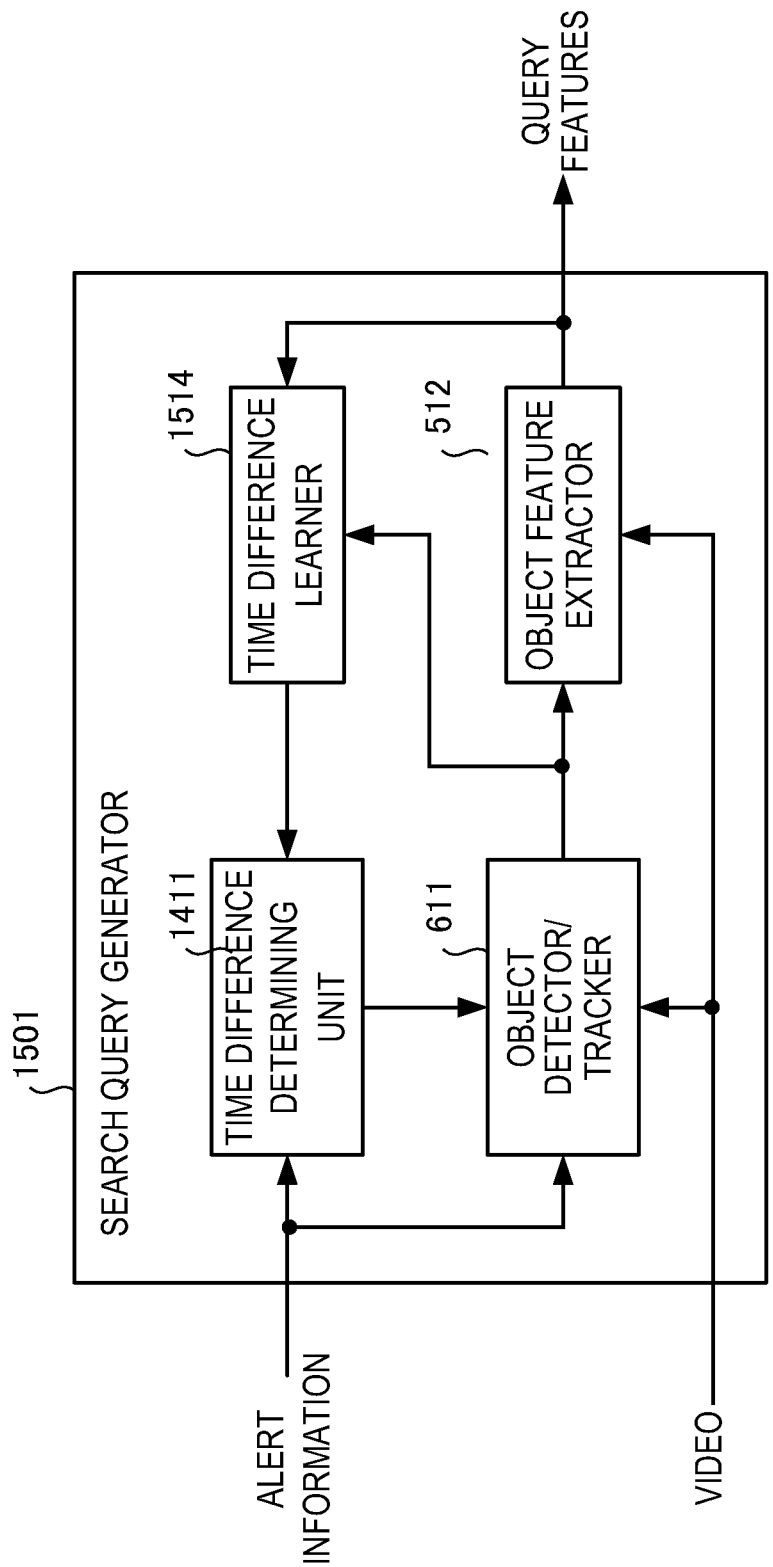
FIG. 15 is a block diagram showing the arrangement of a search query generator according to the seventh embodiment of the present invention.

An information processing apparatus according to the seventh embodiment of the present invention will be described with reference to FIG. 15. FIG. 15 is a block diagram for explaining the arrangement and use method of a search query generator 1501 according to this embodiment. This embodiment is different from the above-described sixth embodiment in that a time difference learner 1514 learns the time difference in consideration of an object feature extraction result as well. The rest of the arrangement and operation is the same as in the sixth embodiment. The same arrangement and operation are denoted by the same reference numerals, and a detailed description thereof will be omitted.

The time difference learner 1514 determines the time difference in consideration of the reliability of an extracted object feature as well. The reliability calculation method is the same as described above. The reliability of clothing feature extraction can be determined based on the aspect ratio of the circumscribed rectangle of a person or the degree of person likelihood of a person silhouette shape. As for a color feature, the reliability can be evaluated by analyzing the magnitude of saturation and that of brightness of a color (if the saturation or brightness is low, the influence of shadow or the like is supposedly present) and the presence/absence of a saturated portion. Learning is performed by selecting a time difference of a reliable feature.

As described above, according to this embodiment, since the time difference is learned in consideration of the reliability of a feature, the object extraction image selection accuracy is improved along with the use. As a result, the accuracy of query features is improved.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

Other Expressions of Embodiments

Some or all of the above-described embodiments can also be described as in the following supplementary notes but are not limited to the followings.

(Supplementary Note 1)
There is provided an information processing apparatus comprising:
a sensor that analyzes a captured video and senses whether a predetermined event has occurred;
a determining unit that determines a type of an object to be used as query information based on a type of the event in response to sensing of the event occurrence; and
a generator that detects the object of the type determined by the determining unit from the video and generates the query information based on the object.

(Supplementary Note 2)
There is provided the information processing apparatus according to supplementary note 1, wherein the generator generates a feature of the object of the type determined by the determining unit as the query information.

(Supplementary Note 3)
There is provided the information processing apparatus according to supplementary note 1 or 2, wherein the generator generates the query information of the type determined by the determining unit using the video at a timing different by a predetermined time difference from a time of the event occurrence, and
the determining unit further determines the predetermined time difference in accordance with the type of the event.

(Supplementary Note 4)
There is provided the information processing apparatus according to supplementary note 1, 2, or 3, wherein the generator generates the query information using the video in a predetermined time width at the timing different from the time of the event occurrence, and
the determining unit further determines the predetermined time width in accordance with the type of the event.

(Supplementary Note 5)
There is provided the information processing apparatus according to any one of supplementary notes 1 to 4, wherein the generator generates the query information using a predetermined region in the video, and
the determining unit further determines the predetermined region in accordance with the type of the event.

(Supplementary Note 6)
There is provided the information processing apparatus according to any one of supplementary notes 1 to 5, wherein the generator generates the query information using a predetermined number of images including at least one image in the video, and
the determining unit further determines the predetermined number in accordance with the type of the event.

(Supplementary Note 7)
There is provided the information processing apparatus according to any one of supplementary notes 1 to 6, further comprising:
a tracker that tracks the object associated with the event; and an updater that updates the time difference determined by the determining unit by calculating, from a result of the tracking of the object by the tracker, the time difference from the time of the event occurrence to the timing of the image to generate the query information.

(Supplementary Note 8)
There is provided the information processing apparatus according to any one of supplementary notes 1 to 7, wherein the event is finding of a person included in a predetermined list, the sensor determines, based on a face image of the person, whether the person is a person included in the list, and
the determining unit determines clothing of the person included in the list as the query information.

(Supplementary Note 9)

There is provided the information processing apparatus according to any one of supplementary notes 1 to 8, wherein the event is finding of a fall of a person in the video, and
the determining unit determines clothing of the person who has fallen before the fall as the query information.

(Supplementary Note 10)

There is provided the information processing apparatus according to any one of supplementary notes 1 to 9, wherein the event is finding of one of abandonment and carry away of luggage, and
the determining unit determines clothing of a person who has abandoned or carried away the luggage as the query information.

(Supplementary Note 11)

There is provided the information processing apparatus according to any one of supplementary notes 1 to 10, wherein the event is finding of a person who has entered a restricted area in the video, and
the determining unit determines clothing of the person who has entered the restricted area as the query information.

(Supplementary Note 12)

There is provided an information processing method comprising: analyzing a captured video and sensing whether a predetermined event has occurred;
deciding a type of query information to be searched for in accordance with on a type of the event in response to sensing of the event occurrence; and
generating the query information of the type determined in the deciding from the video.

(Supplementary Note 13)

There is provided the information processing method according to supplementary note 12, wherein in the generating, a feature of the object of the type determined in the deciding is generated as the query information.

(Supplementary Note 14)

There is provided the information processing method according to supplementary note 12 or 13, wherein in the generating, the query information of the type determined in the deciding is generated using the video at a timing different by a predetermined time difference from a time of the event occurrence, and
in the deciding, the predetermined time difference is further determined in accordance with the type of the event.

(Supplementary Note 15)

There is provided the information processing method according to supplementary note 12, 13, or 14, wherein in the generating, the query information is generated using the video in a predetermined time width at the timing different from the time of the event occurrence, and
in the deciding, the predetermined time width is further determined in accordance with the type of the event.

(Supplementary Note 16)

There is provided the information processing method according to any one of supplementary notes 12 to 15, wherein in the generating, the query information is generated using a predetermined region in the video, and
in the deciding, the predetermined region is further determined in accordance with the type of the event.

(Supplementary Note 17)

There is provided the information processing method according to any one of supplementary notes 12 to 16, wherein in the generating, the query information is generated using a predetermined number of images including at least one image in the video, and
in the deciding, the predetermined number is further determined in accordance with the type of the event.

(Supplementary Note 18)

There is provided the information processing method according to any one of supplementary notes 12 to 17, further comprising:
tracking the object associated with the event; and
updating the time difference determined in the deciding by calculating, from a result of the tracking of the object in the tracking, the time difference from the time of the event occurrence to the timing of the image to generate the query information.

(Supplementary Note 19)

There is provided the information processing method according to any one of supplementary notes 12 to 18, wherein the event is finding of a person included in a predetermined list,
in the analyzing the captured video and sensing whether the predetermined event has occurred, it is determine, based on a face image of the person, whether the person is a person included in the list, and
in the deciding, clothing of the person included in the list is determined as the query information.

(Supplementary Note 20)

There is provided the information processing method according to any one of supplementary notes 12 to 19, wherein the event is finding of a fall of a person in the video, and
in the deciding, clothing of the person who has fallen before the fall is determined as the query information.

(Supplementary Note 21)

There is provided the information processing method according to any one of supplementary notes 12 to 20, wherein the event is finding of one of abandonment and carry away of luggage, and
in the deciding, clothing of a person who has abandoned or carried away the luggage is determined as the query information.

(Supplementary Note 22)

There is provided the information processing method according to any one of supplementary notes 12 to 21, wherein the event is finding of a person who has entered a restricted area in the video, and
the deciding, clothing of the person who has entered the restricted area is determined as the query information.

(Supplementary Note 23)

There is provided an information processing program for causing a computer to execute:
analyzing a captured video and sensing whether a predetermined event has occurred;
deciding a type of query information to be searched for in accordance with on a type of the event in response to sensing of the event occurrence; and
generating the query information of the type determined in the deciding from the video.

(Supplementary Note 24)

There is provided the information processing program according to supplementary note 23, wherein in the generating, a feature of the object of the type determined in the deciding is generated as the query information.

(Supplementary Note 25)

There is provided the information processing program according to supplementary note 23 or 24, wherein in the generating, the query information of the type determined in the deciding is generated using the video at a timing different by a predetermined time difference from a time of the event occurrence, and in the deciding, the predetermined time difference is further determined in accordance with the type of the event.

(Supplementary Note 26)

There is provided the information processing program according to supplementary note 23, 24, or 25, wherein in the generating, the query information is generated using the video in a predetermined time width at the timing different from the time of the event occurrence, and in the deciding, the predetermined time width is further determined in accordance with the type of the event.

(Supplementary Note 27)

There is provided the information processing program according to any one of supplementary notes 23 to 26, wherein in the generating, the query information is generated using a predetermined region in the video, and in the deciding, the predetermined region is further determined in accordance with the type of the event.

(Supplementary Note 28)

There is provided the information processing program according to any one of supplementary notes 23 to 27, wherein in the generating, the query information is generated using a predetermined number of images including at least one image in the video, and in the deciding, the predetermined number is further determined in accordance with the type of the event.

(Supplementary Note 29)

There is provided the information processing program according to any one of supplementary notes 23 to 28, further comprising:

tracking the object associated with the event; and updating the time difference determined in the deciding by calculating, from a result of the tracking of the object in the tracking, the time difference from the time of the event occurrence to the timing of the image to generate the query information.

(Supplementary Note 30)

There is provided the information processing program according to any one of supplementary notes 23 to 29, wherein the event is finding of a person included in a predetermined list, in the analyzing the captured video and sensing whether the predetermined event has occurred, it is determine, based on a face image of the person, whether the person is a person included in the list, and in the deciding, clothing of the person included in the list is determined as the query information.

(Supplementary Note 31)

There is provided the information processing program according to any one of supplementary notes 23 to 30, wherein the event is finding of a fall of a person in the video, and in the deciding, clothing of the person who has fallen before the fall is determined as the query information.

(Supplementary Note 32)

There is provided the information processing program according to any one of supplementary notes 23 to 31, wherein the event is finding of one of abandonment and carry away of luggage, and in the deciding, clothing of a person who has abandoned or carried away the luggage is determined as the query information.

(Supplementary Note 33)

There is provided the information processing program according to any one of supplementary notes 23 to 32, wherein the event is finding of a person who has entered a restricted area in the video, and in the deciding, clothing of the person who has entered the restricted area is determined as the query information.

This application claims the benefit of Japanese Patent Application No. 2012-217592 filed on Sep. 28, 2012, which is hereby incorporated by reference herein in its entirety.

What is claimed is:

1. An information processing system comprising: one or more memories storing: time difference information designating a time period of video data at least one before and after luggage abandonment has occurred as a predetermined event; and program instructions; and one or more processors configured to execute the program instructions to, each of a plurality of times starting with a first time: analyze a captured video and sense occurrence of the predetermined event; detect an object relating to the predetermined event from the captured video, using a capturing time which is calculated based on a time of the occurrence of the predetermined event and the time difference information, wherein the time difference information that is used the first time the object is detected is predetermined time information, and the time different information that is used each time the object is detect other than the first time is the time difference information as has been updated a preceding time; track the detected object; extract a feature of the detected object as query information; search the captured video using the query information to identify images in the captured video that include the extracted feature; output the identified images; learn, from a result of detection and tracking of the object, a time difference between the time of the occurrence of the predetermined event and a time when the feature is extracted; and update the time difference information using the learned time difference, such that the time different as has been updated is used in detecting the object a next time.

2. The information processing system according to claim 1, wherein the one or more memories store the time difference information that designates a plurality of specified time differences for the predetermined event, the plurality of specified time differences being longer than a time difference between the time of the occurrence of the predetermined event and a time when the luggage abandonment is detected; and the one or more processors extract the feature in a plurality of frames at capturing times calculated using the specified time differences, respectively.

3. The information processing system according to claim 1, wherein the one or more processors determine that the detected object is the luggage that was abandoned if the detected object is at rest for a predetermined time.

4. The information processing system according to claim 1, wherein the one or more processors determine that the detected object is the person who abandoned the luggage, as a person nearest to the abandoned luggage at a specified time difference after the luggage abandonment that is longer than a time difference between the time of the occurrence of the predetermined event and a time when the luggage abandonment is detected.

5. The information processing system according to claim 1, wherein the one or more processors learn the time difference using a reliability of the feature.

6. A method performed by a computer and comprising: storing time difference information designating a time period of video data at least one before and after luggage abandonment has occurred as a predetermined event; each of a plurality of times starting with a first time: analyzing a captured video and sense occurrence of the predetermined event; detecting an object relating to the predetermined event from the captured video, using a capturing time which is calculated based on a time of the occurrence of the predetermined event and the time difference information, wherein the time difference information that is used the first time the object is detected is predetermined time information, and the time different information that is used each time the object is detect other than the first time is the time difference information as has been updated a preceding time; tracking the detected object; extracting a feature of the detected object as query information; searching the captured video using the query information to identify images in the captured video that include the extracted feature; outputting the identified images; learning, from a result of detection and tracking of the object, a time difference between the time of the occurrence of the predetermined event and a time when the feature is extracted; and updating the time difference information using the learned time difference, such that the time different as has been updated is used in detecting the object a next time.

7. The method according to claim 6, further comprising storing the time difference information that designates a plurality of specified time differences for the predetermined event, the plurality of specified time differences being longer than a time difference between the time of the occurrence of the predetermined event and a time when the luggage abandonment is detected; and extracting the feature in a plurality of frames at capturing times calculated using the specified time differences, respectively.

8. The method according to claim 6, further comprising determining that the detected object is the luggage that was abandoned if the detected object is at rest for a predetermined time.

9. The method according to claim 6, further comprising determining that the detected object is the person who abandoned the luggage, as a person nearest to the abandoned luggage at a specified time difference after the luggage abandonment that is longer than a time difference between the time of the occurrence of the predetermined event and a time when the luggage abandonment is detected.

10. The method according to claim 6, further comprising learning the time difference using a reliability of the feature.

11. A non-transitory computer readable medium storing a program causing a computer to execute a process comprising: storing time difference information designating a time period of video data at least one before and after luggage abandonment has occurred as a predetermined event; each of a plurality of times starting with a first time: analyzing a captured video and sense occurrence of the predetermined event; detecting an object relating to the predetermined event from the captured video, using a capturing time which is calculated based on a time of the occurrence of the predetermined event and the time difference information, wherein the time difference information that is used the first time the object is detected is predetermined time information, and the time different information that is used each time the object is detect other than the first time is the time difference information as has been updated a preceding time; tracking the detected object; extracting a feature of the detected object as query information; searching the captured video using the query information to identify images in the captured video that include the extracted feature; outputting the identified images; learning, from a result of detection and tracking of the object, a time difference between the time of the occurrence of the predetermined event and a time when the feature is extracted; and updating the time difference information using the learned time difference, such that the time different as has been updated is used in detecting the object a next time.

12. The non-transitory computer readable medium according to claim 11, wherein the process further comprises: storing the time difference information that designates a plurality of specified time differences for the predetermined event, the plurality of specified time differences being longer than a time difference between the time of the occurrence of the predetermined event and a time when the luggage abandonment is detected; and extracting the feature in a plurality of frames at capturing times calculated using the specified time differences, respectively.

13. The non-transitory computer readable medium according to claim 11, wherein the process further comprises determining that the detected object is the luggage that was abandoned if the detected object is at rest for a predetermined time.

14. The non-transitory computer readable medium according to claim 11, wherein the process further comprises determining that the detected object is the person who abandoned the luggage, as a person nearest to the abandoned luggage at a specified time difference after the luggage abandonment that is longer than a time difference between the time of the occurrence of the predetermined event and a time when the luggage abandonment is detected.

15. The non-transitory computer readable medium according to claim 11, wherein the process further comprises learning the time difference using a reliability of the feature.

* * * * *